United States Patent
Pages

(10) Patent No.: US 6,276,305 B1
(45) Date of Patent: Aug. 21, 2001

(54) COMPACT DOG LEASH

(76) Inventor: Gary M. Pages, P.O. Box 663, Sisters, OR (US) 97759

(*) Notice: Subject to any disclaimer, the term of this patent is extended or adjusted under 35 U.S.C. 154(b) by 0 days.

(21) Appl. No.: 09/543,389

(22) Filed: Apr. 5, 2000

(51) Int. Cl.$^7$ .................................................. A01K 27/00
(52) U.S. Cl. ........................................ 119/792; 119/795
(58) Field of Search ..................... 119/795, 792, 119/863, 856, 858, 109, 797; 54/34, 19.1; 224/172; 493/405; 24/68, 712; D30/134, 153, 152; 383/72, 4; 206/216

(56) References Cited

U.S. PATENT DOCUMENTS

| | | | |
|---|---|---|---|
| 2,929,358 | * | 3/1960 | Morrow . |
| 4,774,801 | * | 10/1988 | Johansen et al. ............... 54/34 |
| 5,233,942 | * | 8/1993 | Cooper et al. ............... 119/792 |
| 5,497,733 | * | 3/1996 | Hull et al. ............... 119/793 |
| 5,560,321 | * | 10/1996 | Hess ............... 119/858 |

* cited by examiner

Primary Examiner—Peter M. Poon
Assistant Examiner—Andrea M. Valenti
(74) Attorney, Agent, or Firm—Robert E. Howard

(57) ABSTRACT

A compact dog leash integral with a carrying pouch that can be attached to the collar of a dog. The pouch has front and rear walls, end walls, a bottom and a top. The top has a flap that extends partially over the front wall and is releasably secured thereto. The pouch can be attached to the collar of a dog by means of a locking carabiner. A leash a attached at its inner portion to the bottom of the pouch is formed of a plurality of fold sections joined to adjacent fold sections by fold hinges. A compaction string is attached at its inner end to an inner portion of the leash and to the bottom of the pouch, and passes through the centers of the fold sections of the leash in a manner which allows the fold sections to be extended and collapsed along the compaction string in an accordion-like manner. The fold sections and fold hinges are adapted to allow the leash to be extended along the compaction string from its collapsed position into an elongated leash, and collapsed along the compaction string from its extended position into a compact stack that fits inside the pouch. A handle is located at the outer end of the leash.

3 Claims, 1 Drawing Sheet

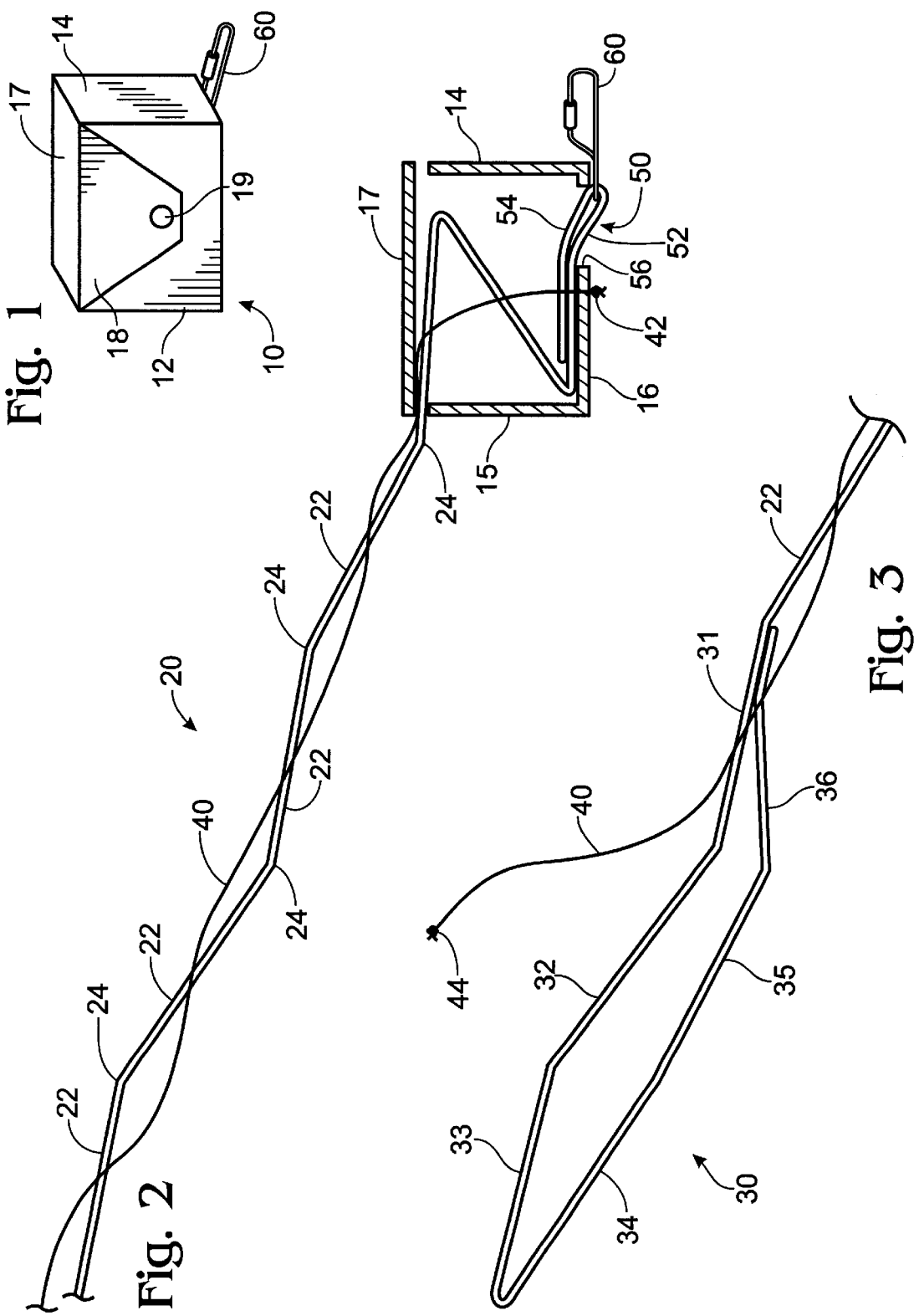

COMPACT DOG LEASH

BACKGROUND OF THE INVENTION

This invention relates to a compact dog leash that is attached to a carrying pouch from which it can be easily removed and easily repacked back inside the pouch. The pouch containing the leash can be attached to the collar of a dog and carried by the dog until the leash is needed.

A number of leashes that can be attached to a dog's collar and carried by the dog until needed have been proposed over the years. Most are bulky and/or unsafe.

U.S. Pat. No. 5,233,942 describes a leash inside a carrying case that can be attached to a dog's collar and carried by the dog until the leash is needed. Although the leash is easily deployed when needed, it has to be very precisely rolled or folded up to be placed back inside it's carrying case.

SUMMARY OF THE PRESENT INVENTION

It is an object of the present invention to provide a compact dog leash that is integral with a carrying pouch that is safe and comfortable for a dog to carry on its collar.

It is a further object of the present invention to provide a compact dog leash that is integral with a carrying pouch in a manner that allows easy deployment and easy repacking of the leash back inside the pouch when no longer needed.

These and other objects are accomplished by providing a leash that is folded in an accordion-like manner within a carrying pouch, the inner end of the leash being attached to the bottom of the pouch to form an integral structure therewith.

A compaction string is attached at its inner end to both the carrying pouch and the inner end of the leash. The compaction string passes through the mid-point of each fold section of the leash to permit easy collapse of the fold sections of the leash along the compaction string into a compact storable unit located inside the carrying pouch.

A handle section is attached to the outer end of the leash.

The pouch is attached to a dog's collar by a locking carabiner which securely locks the pouch and leash to the collar.

BRIEF DESCRIPTION OF THE DRAWINGS

FIG. 1 is a front, perspective view of the carrying pouch of the present invention;

FIG. 2 is a partial front view, partially in section, of the deployed leash of the present invention; and FIG. 3 is an enlarged front view of the handle section of the leash of the present invention.

DESCRIPTION OF PREFERRED EMBODIMENTS

Leash carrying pouch 10 has a front wall 12, a rear wall (not shown) the same size as, and parallel to, front wall 12, a first end wall 14, a second end wall 15, a bottom 16, a top 17, and a closure flap 18 extending from, and integral with, top 17. A button 19 attached to front wall 12 passes through a button hole in flap 18 to close pouch 10.

Leash 20 is comprised of a plurality of inner fold sections 22 and handle fold sections 31–36. The length of each fold section is slightly shorter than the length of the distance between end walls 14 and 15 of pouch 10, preferably about two inches. The width of each fold section is slightly less than the width of end walls 14 and 15, preferably about 0.75 inch.

Each fold section 22 and 31–36 is attached to adjacent fold sections by fold hinges 24. Fold sections 22 and 31–36, and fold hinges 24 are integral with each other, being formed from a single piece of webbing.

The outer end of leash 20 has a handle 30 formed by folding the last several fold sections 31–36 back on themselves, and attaching the handle fold section 31 to handle fold section 36, as shown in FIG. 3. In the preferred embodiment, where the fold sections 31–36 are each about two inches long, it is preferred to fold back the next-to-last three sections 31–33 over the last three sections 34–36 to form a six inch handle to easily accommodate a hand placed therein.

Handle fold section 31 can be attached to handle fold section 36 by any suitable attachment means, such as sewing or gluing.

Although leash 20 has been illustrated in the drawings as having rather rigid looking fold sections 20 for sake of clarity, it is to be understood that leash 20 can be made of any foldable material having sufficient strength to act as a dog leash. A suitable such material for leash 20 is nylon webbing having a 200 pound tensile strength and a width of 0.75 inch.

The inner end of compaction string 40 is first sewn several times through the inner leash fold section adjacent the bottom 16 of pouch 10, and then passed through the bottom 16, the outer end thereof being tied into a knot 42 of a size sufficient to further prevent compaction string 40 from being pulled through bottom 16.

Compaction string 40 passes through each inner fold section 22 at the center thereof, and through the center of handle fold section 31, as shown.

The outer end of compaction string 40 is tied into a knot 44 of a size sufficient to prevent compaction string 40 from being pulled back through handle fold section 31.

Compaction string 40 can be formed of any material having sufficient strength, such as masonry string having a tensile strength of 150 pounds.

A loop 50 is formed by the innermost fold sections 52 and 54 being folded back on themselves, as shown in FIG. 1, and attached in any suitable manner to form loop 50. Fold sections 52 and 54 may be attached together, for example, by sewing or stapling. Fold sections 52 and 54 pass through a slot 56 located in bottom 16 of pouch 10. Slot 56 is located approximately at the mid-point of bottom 16 of pouch 10 to minimize the extent to which loop 50 and attached collar fastener 60 extends out of pouch 10.

Loop 50 passes through, and holds in place, a collar leash ring fastener 60. Collar fastener 60 is preferably a locking carabiner, an oval metal ring with a locking link used to fasten a rope to the piton in mountain climbing.

In use, pouch 10 containing leash 20 is attached to the leash ring of a dog's collar by means of locking carabiner 60. When it becomes desirable for the dog to be on a leash, a finger can be inserted into the space between an end wall and top 17 of pouch 10 to push out enough of handle 30 to allow leash 20 to be grabbed and pulled out of and away from pouch 10, leaving top 17 buttoned to front wall 12. As leash 20 is extended, the various fold sections 22 unfold in an accordion like manner along compaction string 40 into a configuration substantially as shown in FIGS. 2 and 3.

When it is time to put leash 20 away, button 19 is pushed through its related buttonhole in flap 18 and top 17 raised. Knot 44 of compaction string 40 is taken in one hand and handle 30 pushed down the compaction string with the other hand, which collapses all of the fold sections 22 in an accordion-like manner into a compact folded leash unit located inside pouch 10. Compaction string 40 is easily wrapped around a thumb or two fingers to form a roll that fits on top of the folded leash 20 inside pouch 10.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A compact dog leash comprising:
   a leash carrying pouch having front and rear walls, first and second end walls, a bottom, a top, and means for releasably fastening said top to said front wall, said bottom having a slot therein;
   a leash having inner and outer ends, the inner end of said leash being attached to said pouch, said leash being formed of a plurality of fold sections, each fold section being joined to adjacent fold sections by fold hinges, said fold sections adapted to be folded about said fold hinges in an accordion-like manner into a stack of fold sections;
   at least two of the fold sections located at said inner end of said leash passing through said slot in said bottom of said pouch and folded back and attached to each other to form a first loop;
   dog collar fastening means attached to said first loop;
   a handle at said outer end of said leash; and
   a compaction string having inner and outer ends, said inner end being attached to the inner portion of said leash and to said bottom of said pouch, said compaction string passing through the centers of said fold sections in a manner adapted to allow said fold sections to be folded and unfolded along said compaction string in an accordion-like manner.

2. The leash of claim 1 wherein said compaction string has means at its outer end to prevent it from being pulled back through said fold sections.

3. The leash of claim 1 wherein said dog collar fastening means is a locking carabiner.

\* \* \* \* \*